(12) United States Patent
He et al.

(10) Patent No.: US 11,856,434 B2
(45) Date of Patent: Dec. 26, 2023

(54) SIGNAL STRENGTH MEASUREMENT METHOD, SIGNAL STRENGTH OBTAINING METHOD, AND RELATED APPARATUS

(71) Applicant: Huawei Technologies Co., Ltd., Shenzhen (CN)

(72) Inventors: Zhijian He, Nanjing (CN); Xiaoyang Xu, Nanjing (CN); Fenglai Wang, Nanjing (CN); Wei Song, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 17/126,760

(22) Filed: Dec. 18, 2020

(65) Prior Publication Data

US 2021/0195455 A1 Jun. 24, 2021

(30) Foreign Application Priority Data

Dec. 20, 2019 (CN) .......................... 201911344230.9

(51) Int. Cl.
*H04W 24/10* (2009.01)
*H04W 24/08* (2009.01)
*H04W 84/12* (2009.01)
*H04W 88/08* (2009.01)

(52) U.S. Cl.
CPC ........... *H04W 24/10* (2013.01); *H04W 24/08* (2013.01); *H04W 84/12* (2013.01); *H04W 88/08* (2013.01)

(58) Field of Classification Search
None
See application file for complete search history.

(56) References Cited

U.S. PATENT DOCUMENTS

| 10,887,837 B1* | 1/2021 | Chu ..................... H04B 17/318 |
| 2007/0060067 A1 | 3/2007 | Ruuska |

(Continued)

FOREIGN PATENT DOCUMENTS

| CN | 101253715 A | 8/2008 |
| CN | 103096301 A | 5/2013 |

OTHER PUBLICATIONS 802.11h "Part 11: Wireless LAN Medium Access Control (MAC) and Physical Layer (PHY) specifications, Amendment 5: Spectrum and Transmit Power Management Extensions in the 5 GHz band in Europe," 2003, 75 pages.

(Continued)

*Primary Examiner* — Chi H Pham
*Assistant Examiner* — Raul Rivas
(74) *Attorney, Agent, or Firm* — Conley Rose, P.C.

(57) ABSTRACT

A signal strength measurement method includes: obtaining, by a first access point (AP), a basic service set identifier (BSSID) of a second AP and a first operating channel, where the first operating channel is an operating channel of the second AP, and a station (STA) is associated with the BSSID of the second AP through the operating channel; and sending, by the first AP, a measurement frame to the STA through the operating channel, where a BSSID value of the measurement frame is the BSSID, the measurement frame indicates the STA to send a measurement response frame of which BS SID value is the BSSID, and the measurement response frame carries a signal strength of the measurement frame measured by the STA.

20 Claims, 6 Drawing Sheets

(56) References Cited

U.S. PATENT DOCUMENTS

| | | | | |
|---|---|---|---|---|
| 2011/0171914 A1* | 7/2011 | Kim | ...................... | H04L 1/0026 |
| | | | | 455/68 |
| 2013/0088983 A1* | 4/2013 | Pragada | ................ | H04W 24/10 |
| | | | | 370/252 |
| 2013/0188628 A1* | 7/2013 | Lee | ...................... | H04W 40/08 |
| | | | | 370/338 |
| 2015/0312875 A1 | 10/2015 | Bhanage | | |
| 2015/0319700 A1 | 11/2015 | Oteri et al. | | |
| 2015/0327265 A1* | 11/2015 | Lee | .................... | H04W 72/541 |
| | | | | 370/315 |
| 2015/0372875 A1 | 12/2015 | Turon et al. | | |
| 2019/0052327 A1* | 2/2019 | Motozuka | ............. | H04W 84/12 |
| 2019/0342795 A1 | 11/2019 | McFarland et al. | | |

OTHER PUBLICATIONS

IEEE Std 802.11k—2008: "Part 11: Wireless LAN Medium Access Control (MAC)and Physical Layer (PHY) Specifications,Amendment 1: Radio Resource Measurement of Wireless LANs," Jun. 12, 2008, 244 pages.

\* cited by examiner

SIGNAL STRENGTH MEASUREMENT METHOD, SIGNAL STRENGTH OBTAINING METHOD, AND RELATED APPARATUS

CROSS-REFERENCE TO RELATED APPLICATIONS

This claims priority to Chinese Patent App. No. 201911344230.9 filed on Dec. 20, 2019, which is incorporated by reference in its entirety.

FIELD

This disclosure relates to the field of communications technology, and in particular, to a signal strength measurement method, a signal strength obtaining method, and a related apparatus.

BACKGROUND

In a wireless local area network (WLAN), an associated access point (AP) cannot obtain a downlink signal strength of a station (STA) relative to a non-associated AP, where the station is associated with the associated AP.

SUMMARY

This disclosure provides a signal strength measurement method, a signal strength obtaining method, and a related apparatus, to solve a technical problem that an associated AP cannot obtain a downlink signal strength of a STA relative to a non-associated AP.

According to a first aspect, a signal strength measurement method, includes: a first access point AP obtains a basic service set identifier BSSID of a second AP and a first operating channel, where the first operating channel is an operating channel of the second AP, and a station STA is associated with the BSSID of the second AP through the operating channel; and the first AP sends a measurement frame to the STA through the operating channel, where a BSSID value of the measurement frame is the BSSID, the measurement frame indicates the STA to send a measurement response frame of which BSSID value is the BSSID, and the measurement response frame carries a signal strength of the measurement frame measured by the STA.

In the technical solution, the first AP sends the measurement frame to the STA based on the BSSID through the first operating channel of the second AP, so that the STA returns the measurement response frame to the second AP. Therefore, the signal strength in the measurement response frame received by the second AP is a signal strength of a signal received by the STA from the first AP. In this way, an associated AP can obtain a downlink signal strength of the STA relative to a non-associated AP.

In a possible implementation, if a second operating channel is different from the first operating channel, the first AP switches to the first operating channel before sending the measurement frame, where the second operating channel is an operating channel of the first AP.

In a possible implementation, before the first AP sends the measurement frame to the STA through the operating channel, the method further includes: the first AP obtains an identifier specified by the second AP, where a value of a token field of the measurement frame is the identifier specified by the second AP.

When the second AP determines signal strengths of a plurality of first APs, the second AP may specify an identifier for each of a plurality of neighboring APs. The measurement frame sent by the first AP to the STA carries the identifier. In addition, the first AP uses the token field to carry the identifier, so that the STA can write the value of the token field into a token field of the measurement response frame without any change, and the first AP can be distinguished from the plurality of neighboring APs by using the identifier without changing the STA.

According to a second aspect, a signal strength obtaining method, includes: a first access point AP indicates a second AP to masquerade as the first AP based on a BSSID of the first AP and an operating channel of the first AP, to send a measurement frame to a STA associated with the BSSID of the first AP; and the first AP receives a measurement response frame sent by the STA, where a BSSID value of the measurement response frame is the BSSID, and the measurement response frame carries a signal strength of the measurement frame measured by the STA.

In a possible implementation, after the first AP receives the measurement response frame sent by the STA, the method further includes: when a determining condition is met, the first AP guides the STA to be associated with the second AP, where the determining condition includes: the signal strength meets a requirement.

In a possible implementation, before the first AP receives the measurement response frame sent by the STA, the method further includes: the first AP provides the second AP with an identifier specified for the second AP, where a value of a token field of the measurement response frame is the specified identifier.

According to a third aspect, an access point AP is a non-associated AP of a station STA, and includes a processor and a transceiver.

The processor is configured to obtain a basic service set identifier BSSID of an associated access point AP and a first operating channel, where the first operating channel is an operating channel of the associated AP, and the station STA is associated with the BSSID of the associated AP through the operating channel.

The transceiver is configured to send a measurement frame to the STA through the operating channel, where a BSSID value of the measurement frame is the BSSID, the measurement frame indicates the STA to send a measurement response frame of which BSSID value is the BSSID, and the measurement response frame carries a signal strength of the measurement frame measured by the STA.

In a possible implementation, if a second operating channel is different from the first operating channel, the transceiver is further configured to switch to the first operating channel before sending the measurement frame, where the second operating channel is an operating channel of the non-associated AP.

In a possible implementation, the processor is further configured to obtain an identifier specified by the associated AP, where a value of a token field of the measurement frame is the identifier specified by the associated AP.

According to a fourth aspect, an access point AP is an associated AP of a station STA, the STA is associated with the BSSID of the AP through an operating channel of the AP, and the AP includes a processor and a transceiver.

The processor is configured to indicate a non-associated AP to masquerade as the associated AP according to the BSSID and the operating channel, to send a measurement frame to the STA.

The transceiver is configured to receive a measurement response frame sent by the STA, where a BSSID value of the measurement response frame is the BSSID, and the measurement response frame carries a signal strength of the measurement frame measured by the STA.

In a possible implementation, the processor is configured to: when a determining condition is met, guide the STA to be associated with the non-associated AP, where the determining condition includes: the signal strength meets a requirement.

In a possible implementation, a value of a token field of the measurement response frame is an identifier specified by the associated AP.

In a possible implementation, the processor sends an instruction to the non-associated AP through a wired interface or a wireless interface, where the instruction may instruct the non-associated AP to masquerade as the associated AP based on the BS SID and the operating channel, to send the measurement frame to the STA.

According to a fifth aspect, a signal strength measurement system includes a non-associated access point AP and an associated AP.

The non-associated AP is configured to obtain a basic service set identifier BSSID of an associated AP and a first operating channel, where the first operating channel is an operating channel of the associated AP, and a station STA is associated with the BSSID of the associated AP through the operating channel.

The non-associated AP is further configured to send a measurement frame to the STA through the operating channel, where a BSSID value of the measurement frame is the BSSID, the measurement frame indicates the STA to send a measurement response frame of which BSSID value is the BSSID, and the measurement response frame carries a signal strength of the measurement frame measured by the STA.

The associated AP is configured to receive the measurement response frame sent by the STA.

DETAILED DESCRIPTION

In the specification, claims, and accompanying drawings, the terms "first", "second", "third", "fourth", and so on (if existent) are intended to distinguish between similar objects but do not necessarily indicate a specific order or sequence. It should be understood that the data termed in such a way is interchangeable in proper circumstances, so that the embodiments described herein can be implemented in other orders than the order illustrated or described herein.

Figure 1:
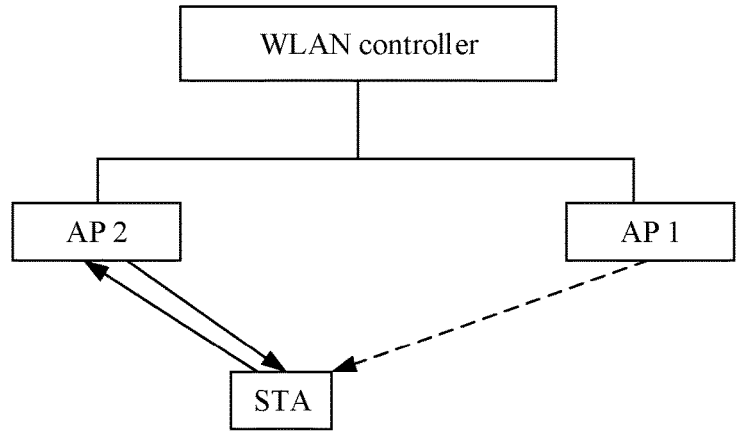
FIG. 1 is a schematic diagram of determining a signal strength by a STA according to an embodiment.

As shown in FIG. 1, both an AP 1 and an AP 2 are connected to a WLAN controller. The WLAN controller may be an Access Controller (AC) in a Control And Provisioning of Wireless Access Points (CAPWAP) protocol. The WLAN controller is a network device, and is responsible for managing an AP connected to the WLAN controller. Management of the AP by the WLAN controller includes configuration provision, intelligent radio frequency management, and access security control.

Communication quality between an AP and a STA is affected by a signal strength. The signal strength may be represented by parameters such as a received signal strength indicator (RSSI), a signal-to-noise ratio (SNR), a signal-to-interference-plus-noise ratio (SINR), a link margin (link margin, LM), and a received channel power indicator (RCPI). The signal strength may be classified into a downlink signal strength and an uplink signal strength according to a transmission direction. The downlink signal strength is generally a signal strength of a signal sent by the AP to the STA, and the uplink signal strength is generally a signal strength of a signal sent by the STA to the AP.

FIG. 1 is a schematic diagram of determining a signal strength by a STA according to an embodiment. When the STA is associated with an AP 2, the AP 2 may obtain an uplink signal strength of the STA based on an uplink packet of the STA. In addition, the AP 2 may further send a measurement frame to the STA. When the STA receives the measurement frame, the STA returns a measurement response frame to the AP 2. The measurement response frame may carry a downlink signal strength corresponding to the AP 2. Therefore, the AP 2 may obtain the downlink signal strength between the AP 2 and the STA from the measurement response frame.

However, the AP 2 cannot obtain a signal strength of the STA relative to the AP 1.

To resolve the foregoing problem, the embodiments provide a signal strength measurement method, to resolve a technical problem that the AP 2 cannot obtain the signal strength of the STA relative to the AP 1. The following describes the solutions with reference to FIG. 2.

Figure 2:
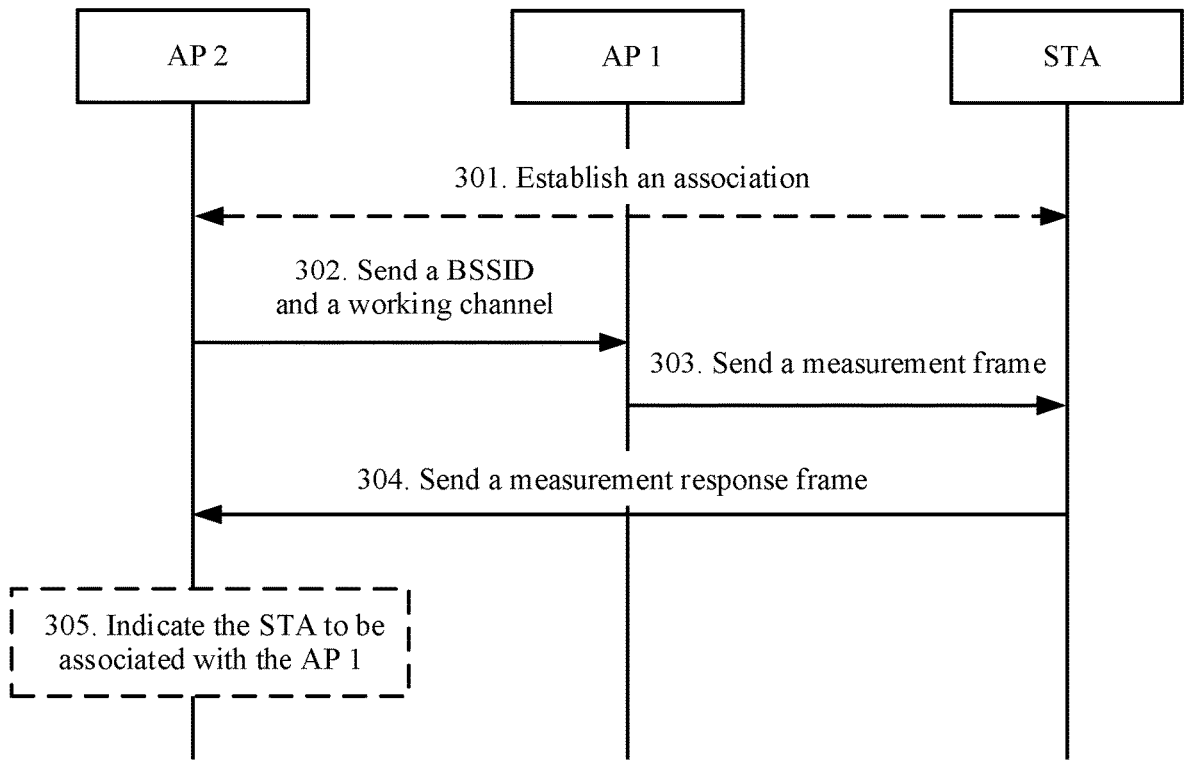
FIG. 2 is a schematic flowchart of a signal strength measurement method according to an embodiment.

FIG. 2 is a schematic flowchart of a signal strength measurement method according to an embodiment. As shown in FIG. 2, the method includes the following steps.

301. An AP 2 establishes an association with a STA.

A process in which the AP 2 establishes an association with the STA may be that the STA first sends an association request to an AP that can be detected. The AP 2 responds to the association request, and the STA may establish an association with the AP 2.

Figure 3:
FIG. 3 is an example diagram of a format of a WLAN frame according to an embodiment.

In this embodiment, after the AP 2 is associated with the STA, the STA communicates with the AP 2 through a WLAN frame. The WLAN frame may be a data frame, a control frame, or a management frame. FIG. 3 is an example diagram of a format of a management frame. The management frame is usually a 3-address frame. Fields of an address 1, an address 2, and an address 3 of the management frame are successively a receiver address (RA), a transmitter address (TA), and a basic service set identifier (BSSID). The RA is a destination address to which the WLAN frame is to be sent. The TA is an address of a STA or an AP that sends the WLAN frame. The BSSID is an identifier of a basic service set (BSS), and a BSSID value is usually a value of a MAC address of an AP of the BSS. A frame body of the management frame is a payload of the management frame. If the AP sends the management frame, the TA of the management frame is an address of the AP, and therefore, a value of the TA is the BSSID value.

302. An AP 1 obtains a BSSID and an operating channel of the AP 2.

In this embodiment, the AP 2 sends an address and channel information of the AP 2 to the AP 1. If the AP 2 has a plurality of operating channels, for example, the AP 2 has a plurality of radio frequency modules that run on respective operating channels, the operating channel information sent by the AP 2 is channel information corresponding to an operating channel used when the AP 2 is associated with the STA. The channel information may be represented by a channel number, for example, a channel 1, a channel 6, and a channel 11. In a practical application, the channel information may be alternatively represented in another manner, for example, a channel frequency band. This is not limited in this embodiment.

The address of the AP 2 may be a BSSID, of the AP 2, that is associated with the STA. If the AP 2 has a plurality of BSSIDs, for example, there are a plurality of virtual APs generated over the AP 2, and these virtual APs have respective BSSIDs, then the AP 2 sends, to the AP 1, a BSSID used when the AP 2 is associated with the STA, to be specific, a BSSID of a virtual AP associated with the STA.

In some embodiments, the AP 2 may send, to the AP 1, the BSSID of the AP 2 and the channel used when the AP 2 is associated with the STA. In a possible example, the AP 2 and the AP 1 are controlled by a same WLAN controller, and the AP 2 may forward the BSSID and the channel information to the AP 1 through the WLAN controller. In another possible example, the AP 2 may forward the BSSID and the channel information to the AP 1 through a plurality of WLAN controllers. In another possible example, the AP 2 may forward the BSSID and the channel information to the AP 1 through wireless communication. A communication manner between the AP 2 and the AP 1 is not limited in this embodiment.

In a possible embodiment, the AP 1 obtains the BSSID and the channel information of the AP 2 that are sent by the AP 2 to the AP 1. In another possible embodiment, the AP 1 obtains the BSSID and the channel information of the AP 2 that are delivered by the WLAN controller to the AP 1. In another possible embodiment, the AP 1 obtains the BSSID of the AP 2 delivered by the WLAN controller to the AP 1, and the channel information of the AP 2 sent by the AP 2 to the AP 1. A specific manner in which the AP 1 obtains the BSSID and the channel information is not limited in this embodiment.

In another possible embodiment, the BSSID may be prestored in the AP 1 and the AP 2. After sending the operating channel to the AP 1, the AP 2 may indicate the AP 1 to masquerade as the AP 2, to send a measurement frame to the STA. In some other embodiments, the BSSID and the operating channel may be sent to the AP 1 in advance for storage. When the AP 2 sends an instruction to the AP 1, the AP 2 instructs the AP 1 to masquerade as the AP 2, to send a measurement frame to the STA.

303. The AP 1 masquerades as the AP 2, to send the measurement frame to the STA through the operating channel of the AP 2.

In this embodiment, the AP 1 may masquerade as the AP 2 based on the obtained address and channel information, to send the measurement frame to the STA.

In this embodiment, after receiving the BSSID and the channel information of the AP 2, the AP 1 may determine whether a current operating channel of the AP 1 is the same as the operating channel corresponding to the channel information.

If the operating channel of the AP 1 is different from the channel corresponding to the channel information, the AP 1 may temporarily leave the operating channel, and send the measurement frame on the channel corresponding to the channel information. Different from operating channel switching, a management frame (for example, a Channel Switch Announcement (CSA) frame) does not need to be sent in the BSS during a temporary channel change.

Switching the operating channel by the AP 1 is temporary switching. After sending the measurement frame through a channel used after the switching, the AP 1 may immediately switch back to the operating channel, to avoid impact on another service of the AP 1, or may switch back to the operating channel after receiving/sending another frame through a channel used after the switching.

For example, if the operating channel of the AP 1 is the channel 6, and the channel information of the AP 2 received by the AP 1 is the channel 11, the AP 1 may temporarily switch to the channel 11 to send the measurement frame. After sending the measurement frame, the AP 1 may immediately switch back to the original channel 6, to avoid impact on another service of the AP 1.

If the operating channel of the AP 1 is the same as the channel corresponding to the channel information, the AP 1 may not switch a channel. For example, if the operating channel of the AP 1 and the operating channel of the AP 2 are both the channel 6, the AP 1 may not leave the operating channel of the AP 1.

An operating channel through which the AP 1 sends the measurement frame is similar to the operating channel of the AP 2. In a possible embodiment, the AP 1 may have a plurality of radio frequency modules that run on respective operating channels. In this case, the AP 1 may send the measurement frame through one of the operating channels. This is not limited in this embodiment.

It may be understood that the measurement frame may be a WLAN frame. For a format of the measurement frame, refer to the description corresponding to FIG. 3. Details are not described herein again. The measurement frame may include a plurality of types, and different types of measurement frames may request different types of signal strengths from the STA. For example, a TPC request frame may be used to request a link margin (LM). Alternatively, for example, a link measurement request frame may be used to request an LM and a received channel power indicator (RCPI). The LM and the RCPI are two indicators representing the signal strength. To conveniently and clearly describe the technical solutions provided in this embodiment, the LM and the RCPI are taken as examples for description in this embodiment, and it should not be understood that only the two indicators can be used to represent the signal strength.

Figure 4:
FIG. 4 is an example diagram of a transmit power control (PTC) request frame according to an embodiment.

In a possible example, the AP 1 sends the TPC request frame to the STA, to request the STA to return a measurement response frame. The measurement response frame carries the LM. FIG. 4 is an example diagram of a TPC request frame according to an embodiment. For example, the TPC request frame may include an RA, a TA, a BSSID, and a TPC request. Before the AP 1 sends the TPC request frame to the STA, the AP 1 may determine the TA and the BSSID in the TPC request frame based on the address of the AP 2. For example, the AP 1 may fill the TA and the BSSID of the measurement frame with the BSSID of the AP 2, so that after receiving the measurement frame, the STA can generate, based on the BSSID of the AP 2 in the measurement frame, the measurement response frame to be sent to the AP 2. The TPC request may be used to indicate the STA to add the LM to the measurement response frame.

Figure 5:
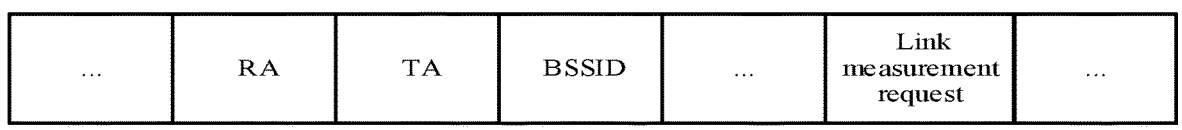
FIG. 5 is an example diagram of a link measurement request frame according to an embodiment.

In another possible example, the AP 1 sends the link measurement request frame to the STA, to request the STA to return a measurement response frame. The measurement response frame carries the LM and the RCPI. FIG. 5 is an example diagram of a link measurement request frame according to an embodiment. For example, the link measurement request frame may include an RA, a TA, a BSSID, and a link measurement request. Before the AP 1 sends the link measurement request frame to the STA, the AP 1 may determine the TA and the BS SID in the link measurement request frame based on the address of the AP 2. For example, the AP 1 may fill the TA and the BS SID of the measurement frame with the BS SID of the AP 2, so that after receiving the measurement frame, the STA can generate, based on the BSSID of the AP 2 in the measurement frame, the measurement response frame to be sent to the AP 2. The link measurement request may be used to indicate the STA to add the LM and the RCPI to the measurement response frame.

The measurement frame may alternatively be in another form. This is not limited in this embodiment.

In this embodiment, the operating channel through which the AP 1 sends the measurement frame is the same as the channel corresponding to the channel information, the TA and the BS SID that are carried in the sent measurement frame use the address of the AP 2, and the AP 1 actually masquerades as the AP 2 to send the measurement frame to the STA. Therefore, the measurement frame sent by AP 1 can be received by the STA.

304. The STA sends the measurement response frame to the AP 2.

In this embodiment, after receiving the measurement frame, the STA may obtain the address of the AP 2 from the measurement frame, to send the measurement response frame to the AP 2 based on the address of the AP 2. Because the measurement frame received by the STA is a measurement frame that is sent by the AP 1 masquerading as the AP 2, the measurement response frame returned by the STA is received by the AP 2.

Figure 6:
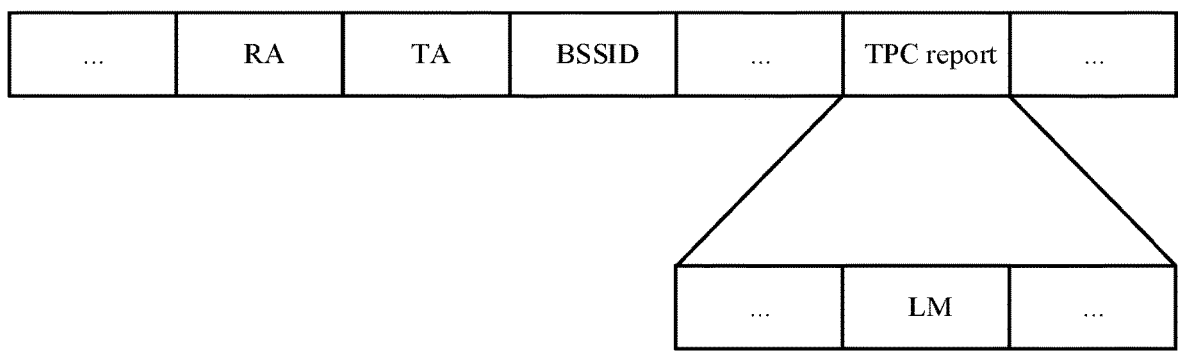
FIG. 6 is an example diagram of a measurement response frame according to an embodiment.

In some embodiments, for example, the measurement frame is the TPC request frame. After receiving the TPC request frame, the STA may obtain the address of the AP 2 from the TPC request frame. For example, the STA may obtain the address of the AP 2 from the TA and the BSSID in the TPC request frame. Then, the STA may generate the measurement response frame based on the address of the AP 2. FIG. 6 is an example diagram of a measurement response frame according to an embodiment. For example, the measurement response frame may include an RA, a TA, a BSSID, and a TPC report. The STA may fill the RA and the BSSID in the measurement response frame with the BS SID of the AP 2. After receiving the TPC request frame, the STA may obtain the LM through measurement, and then fill the TPC report with the LM. Therefore, the measurement response frame sent by the STA to the AP 2 carries the LM.

Figure 7:
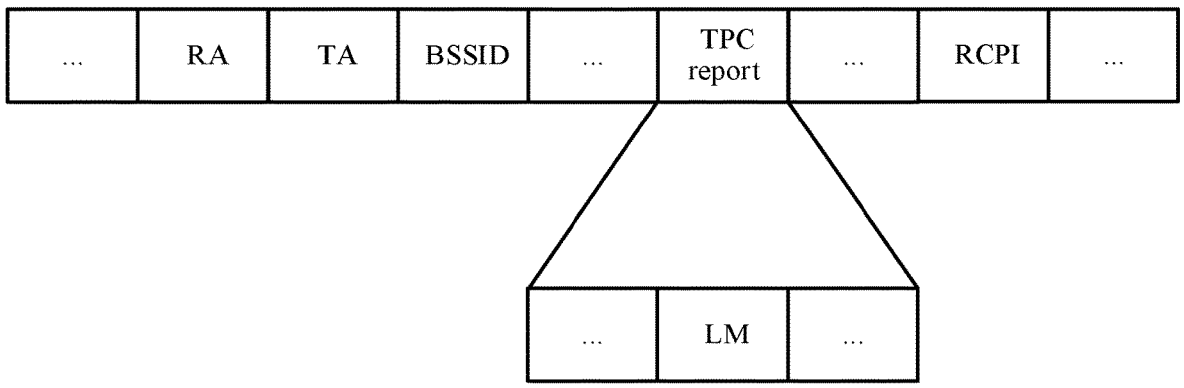
FIG. 7 is another example diagram of a measurement response frame according to an embodiment.

In some embodiments, for example, the measurement frame is the link measurement request frame. After receiving the link measurement request frame, the STA may obtain the address of the AP 2 from the link measurement request frame. For example, the STA may obtain the address of the AP 2 from the TA and the BSSID in the link measurement request frame. Then, the STA may generate the measurement response frame based on the address of the AP 2. FIG. 7 is another example diagram of a measurement response frame according to an embodiment. For example, the measurement response frame may include an RA, a TA, a BSSID, a TPC report, and an RCPI. The STA may fill the RA and the BSSID in the measurement response frame with the BSSID of the AP 2. After receiving the link measurement request frame, the STA may obtain the LM and the RCPI through measurement, then fill the TPC report with the LM, and add the RCPI to a corresponding field in the measurement response frame. Therefore, the measurement response frame sent by the STA to the AP 2 carries the LM and the RCPI.

The measurement response frame sent by the STA to the AP 2 may alternatively be in another form. This is not limited in this embodiment.

In this embodiment, the STA has pre-established an association with the AP 2, and the RA and the BSSID in the measurement response frame sent by the STA are the address of the AP 2. Therefore, the AP 2 can receive the measurement response frame. A signal strength carried in the measurement response frame is actually obtained by the STA through measurement in response to the measurement frame. Therefore, the signal strength actually represents a signal strength of the STA relative to the AP 1. In conclusion, the AP 2 can receive the signal strength of the STA relative to the AP 1, to resolve the technical problem that the AP 2 cannot obtain the signal strength of the STA relative to the AP 1.

Optionally, in some other embodiments, after obtaining the signal strength of the STA relative to the AP 1, the AP 2 may determine, based on whether a determining condition is met, whether to guide the AP 1 to be associated with the STA. To be specific, after step 304, this embodiment may further include step 305.

305. If the determining condition is met, the AP 2 guides the STA to be associated with the AP 1.

In this embodiment, the AP 2 may first determine whether the signal strength of the STA relative to the AP 1 meets the determining condition. For example, the AP 2 may preset the determining condition that the signal strength is greater than 100. When the signal strength obtained by the AP 2 is 200, the AP 2 may determine that the signal strength meets the determining condition. After determining that the signal strength meets the determining condition, the AP 2 may guide the STA to be associated with the AP 1.

It may be understood that the determining condition may include more than one sub-condition. For example, the determining condition may be that the signal strength of the STA relative to the AP 1 is greater than 100 and a signal strength of the STA relative to the AP 2 is less than 50. When all determining conditions are met, the AP 2 guides the AP 1 to be associated with the STA.

The determining condition may further include another sub-condition. For example, the signal strength of the STA relative to the AP 2 is less than the signal strength of the STA relative to the AP 1. This is not limited in this embodiment.

Figure 8:
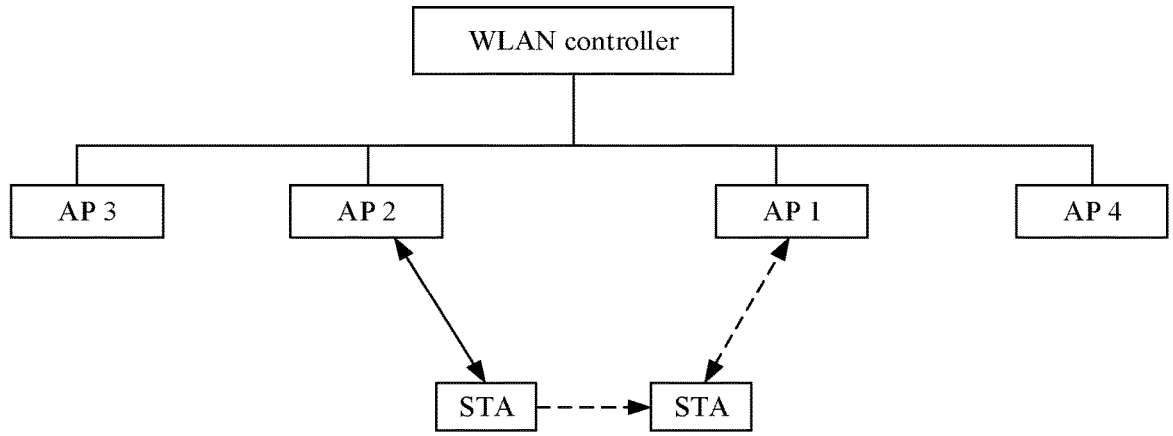
FIG. 8 is an example diagram of a scenario in which an AP 2 guides an AP 1 to be associated with a STA according to an embodiment.

In this embodiment, if the determining condition is met, the AP 2 may guide the AP 1 to be associated with the STA. FIG. 8 is an example diagram of a scenario in which the AP 2 guides the AP 1 to be associated with the STA according to an embodiment. For example, in a public place, a WLAN controller manages a plurality of APs, such as the AP 1, the AP 2, an AP 3, and an AP 4. The AP 1, the AP 2, the AP 3, and the AP 4 are neighboring APs. The neighboring APs are physically adjacent to each other. One AP may be a neighboring AP of a plurality of APs. It can be learned that a current user is associated with the AP 2 through the STA. When the user moves, the STA moves accordingly. As shown by a dashed line with a single arrow in FIG. 8, the STA moves from left to right. The AP 2, the AP 1, and the STA may implement, as described in the foregoing step 301 to step 304, that the AP 2 obtains the signal strength of the STA relative to the AP 1. In some embodiments, the AP 2, the AP 1, and the STA may repeatedly perform step 301 to step 304 at a preset time interval, so that the AP 2 updates the signal strength of the STA relative to the AP 1 at the preset time interval. The preset time interval is not limited in this embodiment. When the AP 2 determines that the determining condition is met, the AP 2 may guide the AP 1 to be associated with the STA.

In some embodiments, the AP 2 may use a BSS transition frame to guide the STA to be associated with the AP 1. In a practical application, the AP 2 may further guide, in another manner, the STA to be associated with the AP 1. This is not limited in this embodiment.

After receiving the signal strength of the STA relative to the AP 1, the AP 2 may further implement another application. For example, the AP 2 may output a network environment report about the STA based on the signal strength related to the STA, and determine a network environment of the STA. This is not limited in this embodiment.

In some embodiments, when the AP 2 is associated with a plurality of STAs, the AP 2 may implement the foregoing embodiment for one of the STAs, or may implement the foregoing embodiment for a plurality of the STAs. The STA fills the TA in the measurement response frame with a MAC address of the STA. Therefore, after receiving the measurement response frame, the AP 2 may determine, based on the MAC address corresponding to the TA in the measurement response frame, the STA that sends the measurement response frame.

Figure 9:
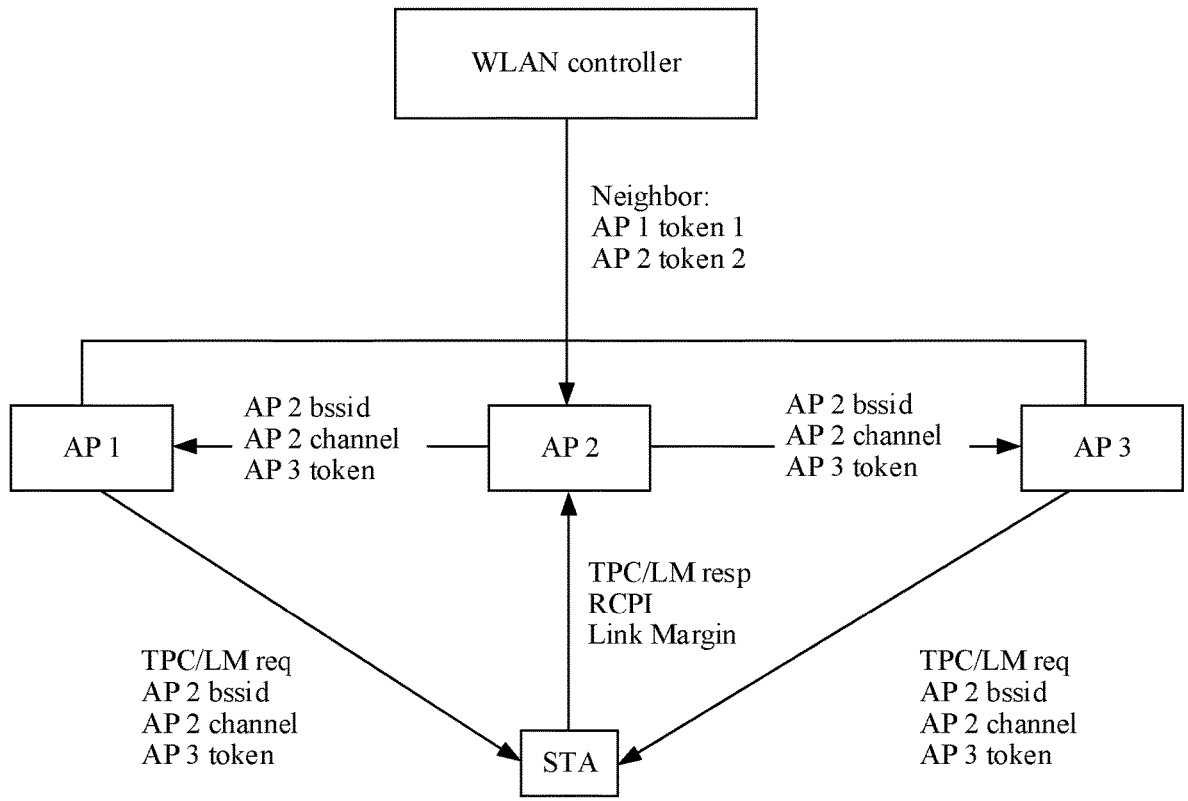
FIG. 9 is a schematic diagram of a signal strength measurement system according to an embodiment.

The AP 2 may determine a signal strength of the STA relative to each of a plurality of APs. As shown in FIG. 9, the AP 2 is a neighboring AP of a plurality of APs. In this case, the AP 2 may determine signal strengths of the STA relative to the AP 1, the AP 3, and the AP 4, to determine whether the AP 2 guides the STA to be associated with one of the APs. When the AP 2 indicates a plurality of neighboring APs to send measurement frames to the STA, the AP 2 obtains a plurality of measurement response frames. In this case, a correspondence between the measurement response frames and the neighboring APs is confusing. Therefore, the AP 2 needs to determine a correspondence between each measurement response frame and a neighboring AP. This embodiment provides two implementations, so that the AP 2 determines the correspondence between the measurement response frames and the neighboring APs. In a possible implementation, the AP 2 may obtain a signal strength of the STA relative to only one neighboring AP each time. Therefore, the AP 2 may determine, based on a current state, a neighboring AP to which a signal strength in a measurement response frame received at this time belongs. For example, the AP 2 may only indicate, for the first time, the AP 1 to send the measurement frame to the STA. In this case, a signal strength in the measurement response frame received by the AP 2 is a signal strength of the STA relative to the AP 1. After the AP 2 determines the signal strength of the STA relative to the AP 1, the AP 2 may start to indicate the AP 3 to send the measurement frame to the STA. In another possible implementation, a corresponding token value may be set on each AP. The AP 2 indicates a neighboring AP to send a measurement frame to the STA, and the measurement frame carries a token value corresponding to the neighboring AP, so that a measurement response frame returned by the STA also carries the token value of the neighboring AP. In this case, the AP 2 may determine, based on the token value of the neighboring AP in the measurement response frame, the neighboring AP to which a signal strength in the measurement response frame belongs. Further, when the neighboring AP uses a token field in the measurement frame to carry the token value of the neighboring AP, a conventional change does not need to be made on the STA, and the STA may also add a value of the token field in the measurement frame to a token field in the measurement response frame. The following describes the detailed process in detail with reference to the embodiments corresponding to FIG. 9 and FIG. 10.

Figure 10:
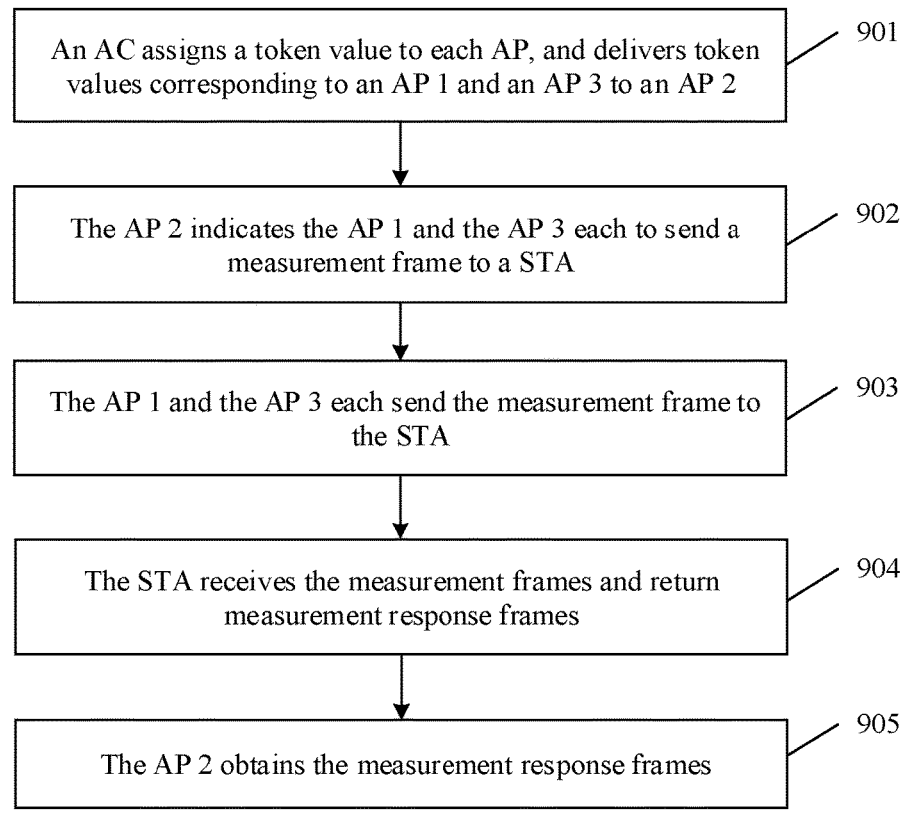
FIG. 10 is a schematic flowchart of a signal strength measurement method according to an embodiment.

FIG. 9 is a schematic diagram of a signal strength measurement system according to an embodiment. FIG. 10 is a schematic flowchart corresponding to FIG. 9. In the embodiment corresponding to FIG. 9 and FIG. 10, an AP 1, an AP 2, and an AP 3 are all connected to a WLAN controller. The AP 1 and the AP 3 may be referred to as neighboring APs of the AP 2. In addition, a STA is currently associated with the AP 2, and is not associated with the AP 1 or the AP 3. In this embodiment, an AP may obtain, by using the following process, a signal strength of the STA relative to the AP 1 and a signal strength of the STA relative to the AP 2:

901. The WLAN controller assigns a token value to each AP, and delivers token values corresponding to the AP 1 and the AP 3 to the AP 2.

In this embodiment, the WLAN controller may generate and assign the token value to each AP. For example, a token value corresponding to the AP 1 is 001, a token value corresponding to the AP 2 is 002, and a token value corresponding to the AP 3 is 003. The WLAN controller may alternatively use another code. This is not limited in this embodiment.

In some embodiments, the WLAN controller may send the token value of the AP 1 and the token value of the AP 3 to the AP 2. Then, the AP 2 sends the token value of the AP 1 to the AP 1 and sends the token value of the AP 3 to the AP 3. In some other embodiments, the WLAN controller may send the token value of the AP 1 to the AP 1, send the token value of the AP 2 to the AP 2, and send the token value of the AP 3 to the AP 3. Therefore, an AP may obtain a token value delivered by the WLAN controller or a token value sent by another AP. A manner in which the AP obtains the token value is not limited in this embodiment.

902. The AP 2 indicates the AP 1 and the AP 3 each to send a measurement frame to the STA.

In some embodiments, the AP 2 may send an instruction to each of the AP 1 and the AP 3, and the instruction is used to instruct the AP 1 and the AP 3 each to send the measurement frame to the STA. In addition, the AP 2 may additionally send, to each of the AP 1 and the AP 3, a BS SID of the AP 2 and an operating channel through which the AP 2 is associated with the STA.

In some other embodiments, the AP 2 may send, to the AP 1 and the AP 3, the BSSID of the AP 2 and the operating channel through which the AP 2 is associated with the STA.

The BSSID and the operating channel may indicate the AP 1 and the AP 3 each to send the measurement frame to the STA.

In some cases, the AP 2 may further send the token value of the AP 1 to the AP 1, and send the token value of the AP 3 to the AP 3. The AP 2 may forward the token values through the WLAN controller, or may send the token values through wired transmission, a WLAN frame, or the like. This is not limited in this embodiment.

In this embodiment, the AP 1 may obtain the token value of the AP 1 delivered by the WLAN controller, or may obtain the token value of the AP 1 sent by the AP 2. The AP 3 obtains the token value of the AP 3 in a similar manner, and details are not described herein again.

903. The AP 1 and the AP 3 each send the measurement frame to the STA.

Figure 11:
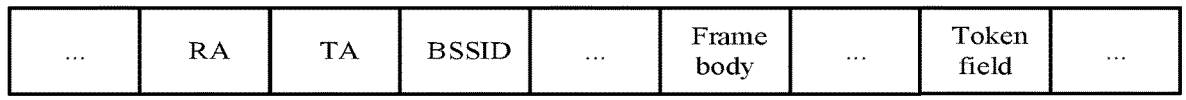
FIG. 11 is an example diagram of a measurement frame according to an embodiment.

In this embodiment, after receiving the instruction of the AP 2, or receiving the BSSID and the operating channel of the AP 2, the AP 1 may send the measurement frame to the STA based on the BSSID and the operating channel. FIG. 11 is an example diagram of a measurement frame according to an embodiment. It can be learned that the measurement frame includes an RA, a TA, a BSSID, a frame body, and a token field. The RA, the TA, and the BSSID are similar to those in the embodiment corresponding to FIG. 4 or FIG. 5, and details are not described herein again. If the measurement frame is a TPC request frame, the frame body is similar to a TPC request in a measurement frame corresponding to FIG. 4. If the measurement frame is a link measurement request frame, the frame body is similar to a link measurement request in a measurement frame corresponding to FIG. 5. Details are not described herein again. A value of the token field of the measurement frame in FIG. 11 may be a token value of an AP. The AP may fill the token field in the measurement frame with the token value of the AP. When the STA receives the measurement frame, the STA fills a token field in a measurement response frame with the value of the token field in the measurement frame.

In some embodiments, the AP 1 first temporarily switches to the operating channel sent by the AP 2, and then sends the measurement frame through the operating channel used after the switching. In some other embodiments, if the AP 1 detects that a current operating channel is the same as the operating channel sent by the AP 2, the AP 1 does not need to switch a channel. A case in which the AP 1 temporarily switches a channel is similar to a description in step 303 in the foregoing embodiment, and details are not described herein again.

In this embodiment, the AP 1 may add the BSSID of the AP 2 and the token value of the AP 1 to the measurement frame. For example, the AP 1 may set a BSSID value in the TPC request frame in FIG. 4 as the BSSID of the AP 2, and fill a token field of the TPC request frame with the token value of the AP 1. In another example, the AP 1 may set a BSSID value in the link measurement request frame in FIG. 5 as the BS SID of the AP 2, and fill a token field of the link measurement request frame with the token value of the AP 1. The AP 1 may fill another position of the measurement frame with the token value of the AP 1, for example, a position of a packet header. This is not limited in this embodiment.

A manner in which the AP 3 generates and sends the measurement frame is similar to the manner in which the AP 1 generates and sends the measurement frame in the embodiment corresponding to FIG. 2, and details are not described herein again.

904. The STA receives the measurement frames and returns measurement response frames.

It may be understood that, in this embodiment, the measurement response frame returned by the STA in response to the measurement frame sent by the AP 1 carries the token value of the AP 1, and the measurement response frame returned by the STA in response to the measurement frame sent by the AP 2 carries the token value of the AP 2. For example, the STA obtains the token value of the AP 1 from the measurement frame sent by the AP 1, and then fills the measurement response frame with the token value of the AP 1.

Figure 12:
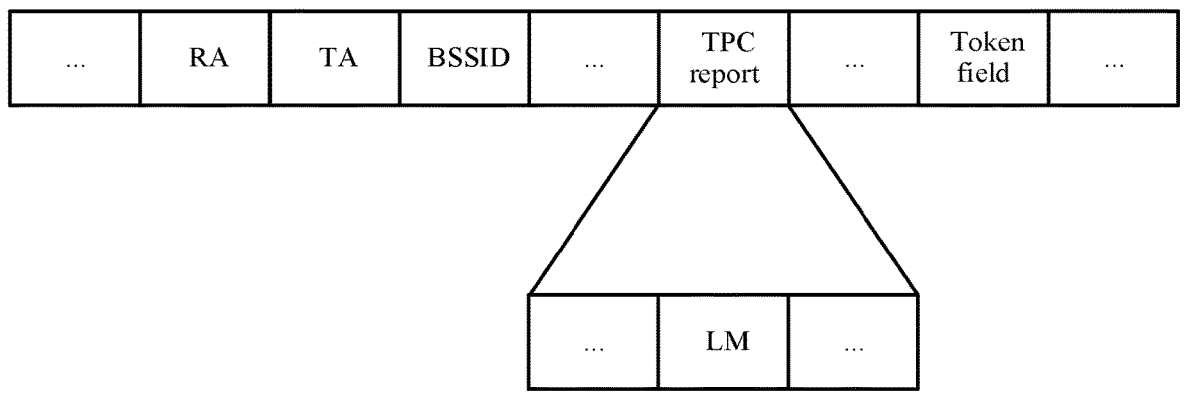
FIG. 12 is an example diagram of a measurement response frame according to an embodiment.

FIG. 12 is an example diagram of a measurement response frame according to an embodiment. The measurement frame includes an RA, a TA, a BSSID, a TPC report, and a token field. The RA, the TA, the BSSID, and the TPC report are similar to those in the embodiment corresponding to FIG. 4, and details are not described herein again. A value of the token field of the measurement response frame in FIG. 12 may be a token value of an AP. After receiving a measurement frame, the STA may obtain a value of a token field, which may be the token value of the AP, in the measurement frame, and then change the value of the token field in the measurement response frame to the value of the token field in the obtained measurement frame. For example, when the STA obtains the measurement frame from the AP 1, and the value of the token field in the measurement frame is the token value of the AP 1, the STA writes the token value of the AP 1 into the token field in the measurement response frame. When receiving the measurement response frame, the AP 2 may obtain the token value of the AP 1 from the measurement response frame, to determine that a signal strength in the measurement response frame is the signal strength of the STA relative to the AP 1.

In this embodiment, the STA may fill the token field in the measurement response frame with the value of the token field in the measurement frame. Therefore, when the AP 1 sets the value of the token field in the measurement frame as the token value of the AP 1, the value of the token field in the measurement response frame with which the STA replies to the AP 2 is the token value of the AP 1, and a reply process of the STA does not need to be changed additionally. Therefore, implementation difficulty and implementation costs of the embodiments are reduced.

In a practical application, the STA may alternatively use another field to represent the token value. This is not limited in this embodiment.

In this embodiment, another case in which the STA receives the measurement frame and returns the measurement response frame is similar to that in step 304 in the foregoing embodiment. Details are not described herein again.

905. The AP 2 obtains the measurement response frame.

After receiving the measurement response frame, the AP 2 may determine, based on the token value in the measurement response frame, that the signal strength in the measurement response frame corresponds to the AP 1 or the AP 3. For example, after the AP 2 receives the measurement response frame, the token value that the AP 2 obtained from the token field of the measurement response frame is 001, and 001 indicates the token value of the AP 1. In this case, the AP 2 may determine that the measurement response frame is sent by the STA when the STA replies to the measurement frame of the AP 1. The signal strength in the measurement response frame is the signal strength of the STA relative to the measurement frame of the AP 1.

For example, Table 1 is an example of a data table generated by the AP 2 in this embodiment. It can be learned that after receiving the two measurement response frames returned by the STA, the AP 2 may determine, from the measurement response frames, a relationship between the STA, a token value, and a signal strength.

TABLE 1

| STA | Token value | Signal strength value |
|-----|-------------|----------------------|
| 1   | 001         | 0                    |
| 1   | 003         | 1                    |

According to the example in Table 1, if a signal strength value of the STA relative to the AP 1 meets a determining condition, the AP 2 may guide the STA to be associated with the AP 1. If a signal strength value of the STA relative to the AP 3 meets the determining condition, the AP 2 may guide the STA to be associated with the AP 3. If the signal strength values of the STA relative to both the AP 1 and the AP 3 meet the determining condition, the AP 2 may further determine a larger signal strength value in the signal strength values of the STA relative to the AP 1 and the AP 3. If the signal strength value of the STA relative to the AP 1 is greater than the signal strength value of the STA relative to the AP 3, the AP 2 may guide the STA to be associated with the AP 1. If the signal strength value of the STA relative to the AP 3 is greater than the signal strength value of the STA relative to the AP 1, the AP 2 may guide the STA to be associated with the AP 3. The foregoing determining process may be implemented by setting a sub-condition of the determining condition. The determining condition is not limited in this embodiment. In addition, for the determining condition, refer to a description about a determining condition in step 305 in the foregoing embodiment. Details are not described herein again.

In this embodiment, that the AP 2 may guide the STA to be associated with the AP 1 or the AP 3 is similar to a description that the AP 2 guides the STA to be associated with the AP 1 in step 305 in the foregoing embodiment. Details are not described herein again.

Figure 13:
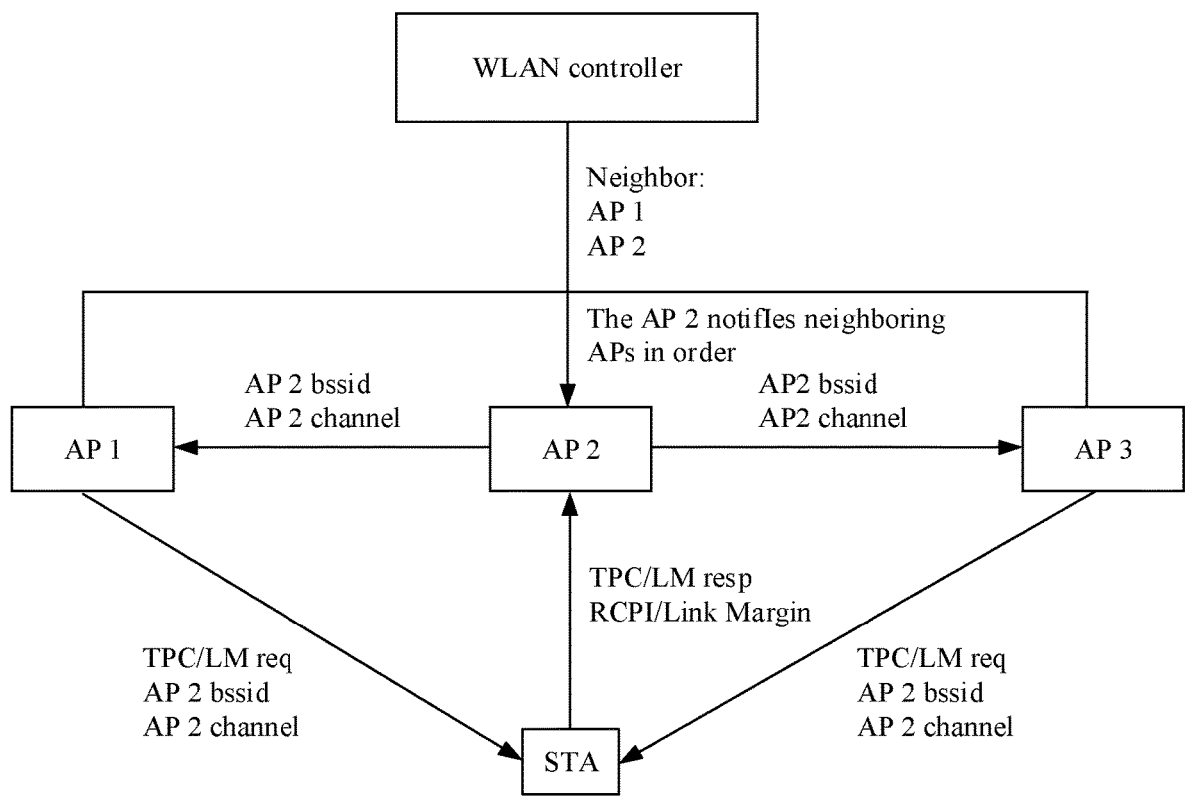
FIG. 13 is another schematic diagram of a signal strength measurement system according to an embodiment.
Figure 14:
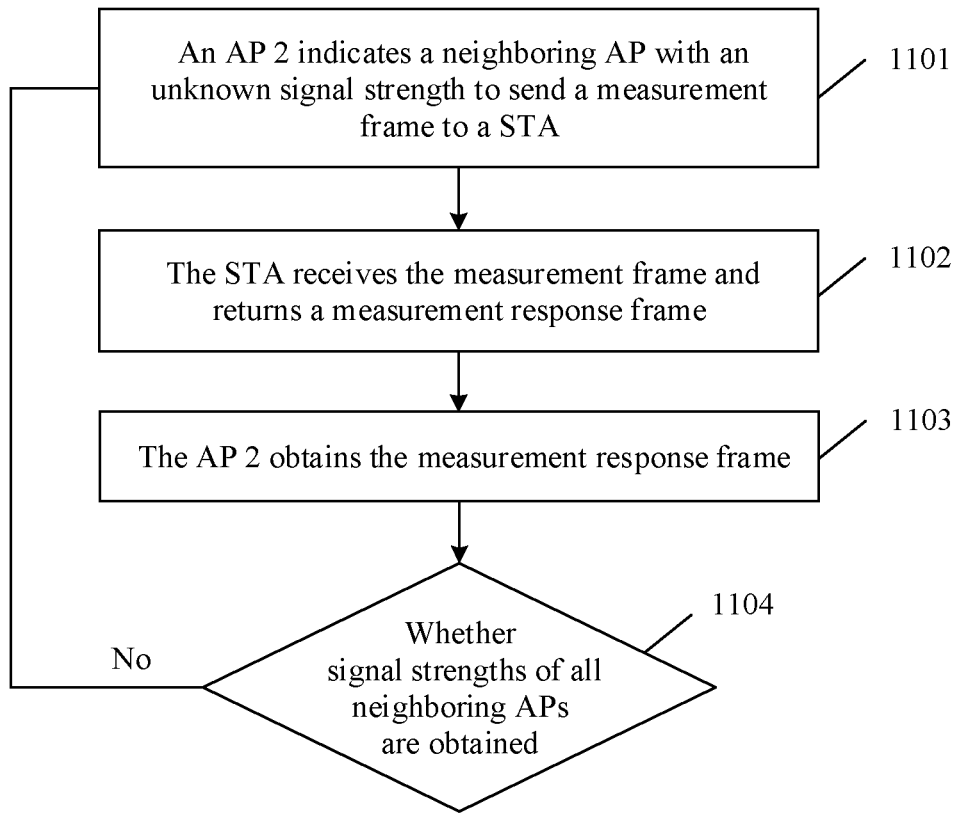
FIG. 14 is another schematic flowchart of a signal strength measurement method according to an embodiment.

FIG. 13 is another example diagram of a signal strength measurement system according to an embodiment. A relationship between a WLAN controller, an AP 1, an AP 2, an AP 3, and a STA is similar to that in the embodiment corresponding to FIG. 9, and details are not described herein again. FIG. 14 is a schematic flowchart corresponding to FIG. 13. The process includes the following steps.

1101. The AP 2 indicates a neighboring AP with an unknown signal strength to send a measurement frame to the STA.

In this embodiment, in an example shown in FIG. 13, neighboring APs of the AP 2 are the AP 1 and the AP 3. Table 2 is an example of a data table in the AP 2. It can be learned that a signal strength value relative to the AP 1 is unknown, and a signal strength value relative to the AP 3 is also unknown. The AP 2 may first indicate the AP 1 to send a measurement frame to the STA. In some cases, the AP 2 may first indicate the AP 3 to send a measurement frame to the STA. This is not limited in this embodiment.

TABLE 2

| STA | AP   | Signal strength value |
|-----|------|----------------------|
| 1   | AP 1 | Not measured         |
| 1   | AP 3 | Not measured         |

After being indicated, the AP 1 may send the measurement frame to the STA. A process in which the AP 1 sends the measurement frame to the STA is similar to step 303 in the embodiment corresponding to FIG. 2, and details are not described herein again.

1102. The STA receives the measurement frame and returns a measurement response frame.

In this embodiment, that the STA receives the measurement frame and returns the measurement response frame is similar to that in step 304 in the embodiment corresponding to FIG. 2, and details are not described herein again.

1103. The AP 2 obtains the measurement response frame.

In this embodiment, after obtaining the measurement response frame, the AP 2 may determine, based on a currently indicated AP, an AP corresponding to the measurement response frame. For example, in step 1101, the AP 2 indicates the AP 1 to send the measurement frame to the STA. Because the AP 2 currently indicates the AP 1 to send the measurement frame to the STA, but does not indicate another AP to send a measurement frame, the measurement response frame received by the AP 2 corresponds to the AP 1.

In some embodiments, if the AP 2 still does not receive a measurement response frame after preset time, the AP 2 may return to step 1101 to indicate the neighboring AP to send the measurement frame again.

In some embodiments, if the AP 2 indicates, for a plurality of times, the AP 1 to send the measurement frame to the STA, but the AP 2 does not receive a measurement response frame after the preset time, the AP 2 may skip the AP 1, and no longer measure a signal strength of the STA relative to the AP 1. For example, the AP 2 may set a maximum quantity of times to 5. If the AP 2 does not receive a measurement response frame for five times, the AP 2 may skip the AP 1, and no longer measure the signal strength of the STA relative to the AP 1. The maximum quantity of times is not limited in this embodiment.

Table 3 is an example of updated data table after the AP 2 obtains the measurement response frame. It can be learned that the AP 2 obtains the signal strength of the STA relative to the AP 1 this time.

TABLE 3

| STA | AP   | Signal strength value |
|-----|------|----------------------|
| 1   | AP 1 | 1                    |
| 1   | AP 3 | Not measured         |

1104. Determine whether signal strengths relative to all neighboring APs are obtained, and if a signal strength relative to a neighboring AP is still not obtained, return to step 1101.

In this embodiment, after the signal strengths relative to all the neighboring APs are obtained, the AP 2 may stop obtaining a signal strength relative to a neighboring APs.

If a signal strength relative to a neighboring AP is still not obtained, the AP 2 returns to step 1101, and continues to obtain a signal strength relative to a next neighboring AP. For example, as shown in Table 3, if a signal strength of the STA relative to the AP 3 is still not obtained, the AP 2 may continue to indicate the AP 3 to send the measurement frame to the STA.

There may be more than three neighboring APs of the AP 2, and the AP 2 may obtain signal strengths of the STA relative to the neighboring APs one by one through the foregoing process. Details are not described in this embodiment.

Figure 15:
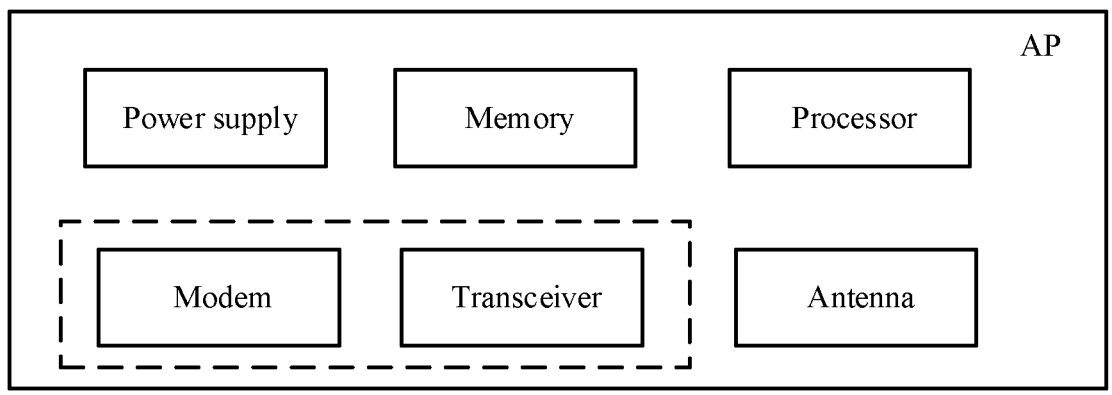
FIG. 15 is an example diagram of an access point according to an embodiment.

FIG. 15 is an example diagram of an access point according to an embodiment. The access point may include but is not limited to including a processor, a modem, a transceiver, and an antenna. The processor is configured to perform steps performed by the AP 1 in the foregoing embodiments, or is configured to perform steps performed by the AP 2 in the foregoing embodiments, or is configured to perform steps performed by the AP 3 in the foregoing embodiments. This is not limited in this embodiment.

The modem is configured to modulate and demodulate a signal that complies with a communications standard. For example, the modem may be configured to modulate and demodulate a measurement frame, a measurement response frame, and the like in the foregoing embodiments. This is not limited in this embodiment.

The transceiver is configured to receive or send the measurement frame, the measurement response frame, and the like in the foregoing embodiments. In some embodiments, the transceiver has both receiving and sending functions. In some other embodiments, the transceiver may alternatively include a separate receiver and a separate transmitter.

In some embodiments, the transceiver may be configured to temporarily switch an operating channel before sending the measurement frame. A management frame does not need to be sent in a BSS during the temporary switching. In addition, after sending the measurement frame, the transceiver may switch the operating channel to an original operating channel. A manner of switching a channel by the transceiver is similar to a manner of switching an operating channel by the AP 1 in step 303 in the embodiment corresponding to FIG. 2, and details are not described herein again.

In some embodiments, the transceiver may temporarily switch the operating channel after receiving an indication of the processor. In some other embodiments, the processor may indicate, in the measurement frame by using some fields, that when detecting that values of some fields in the measurement frame are specific values, the transceiver may temporarily switch the operating channel when sending the measurement frame. A manner (e.g., a triggering manner) to indicate the transceiver to temporarily switch the operating channel is not limited in this embodiment.

In some embodiments, the modem may be integrated into the transceiver. In some other embodiments, the modem and the transceiver may be integrated into the processor. This is not limited in this embodiment.

The antenna may be configured to receive and send a radio frequency signal. In some embodiments, the antenna may be replaced with an antenna array, so that an effect of receiving and sending a signal can be enhanced.

In some embodiments, the access point further includes a memory. The memory may be configured to store a data table similar to Table 1, Table 2, and Table 3, or may be configured to store information such as a BSSID and a channel. This is not limited in this embodiment.

It may be understood that the access point generally further includes a power supply, which is configured to supply power to the access point.

In some embodiments, the access point may further include an interface, for example, a wired interface or a USB port. The access point may be connected to a network, such as a local area network or the Internet, through the wired interface.

In a possible embodiment, the processor may send an instruction to another AP through the wired interface or a wireless interface, and the instruction may instruct an AP receiving the instruction to send a measurement frame based on the BSSID and operating channel information. In another possible embodiment, the processor may send the BSSID and/or the operating channel information to another AP through the wired interface or the wireless interface. After a corresponding AP receives the BS SID and/or the operating channel information, the corresponding AP may send the measurement frame based on the BSSID and the operating channel information. In a practical application, the processor may further send other data through the wired interface or the wireless interface. This is not limited in this embodiment.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

What is claimed is:

1. A method implemented by a first access point (AP) and comprising:
   obtaining a basic service set identifier (BSSID) of a second AP and a first operating channel, wherein the first operating channel is an operating channel of the second AP, and wherein a station (STA) is associated with the BSSID through the first operating channel; and
   sending a measurement frame to the STA through the first operating channel,
   wherein the measurement frame comprises a BSSID value equal to the BSSID,
   wherein the measurement frame instructs the STA to send a measurement response frame comprising the BSSID value, a receiver address (RA), and a signal strength of the measurement frame as measured by the STA, and
   wherein the measurement frame further instructs the STA to fill the BSSID value and the RA with the BS SID.

2. The method of claim 1, further comprising switching to the first operating channel before sending the measurement frame and when a second operating channel of the first AP is different from the first operating channel.

3. The method of claim 1, further comprising obtaining an identifier specified by the second AP before sending the measurement frame.

4. A method implemented by a first access point (AP) and comprising:
- instructing a second AP to masquerade as the first AP based on a basic service set identifier (B S SID) of the first AP and an operating channel of the first AP in order to send a measurement frame to a station (STA) associated with the BSSID; and
- receiving a measurement response frame from the STA, wherein the measurement response frame comprises a BSSID value equal to the BSSID, a receiver address (RA) equal to the BSSID, and a signal strength of the measurement frame as measured by the STA.

5. The method of claim 4, further comprising guiding the STA to be associated with the second AP after receiving the measurement response frame and when the signal strength meets a requirement.

6. The method of claim 4, further comprising providing the second AP with an identifier specified for the second AP before receiving the measurement response frame.

7. A first access point (AP) comprising:
- a processor configured to obtain a basic service set identifier (B S SID) of a second AP and a first operating channel of the second AP, wherein a station (STA) is associated with the BSSID through the first operating channel; and
- a transceiver coupled to the processor and configured to send a measurement frame to the STA through the first operating channel,
- wherein the measurement frame comprises a BSSID value equal to the BSSID,
- wherein the measurement frame instructs the STA to send a measurement response frame comprising the BSSID value, a receiver address (RA), and a signal strength of the measurement frame as measured by the STA, and
- wherein the measurement frame further instructs the STA to fill the BSSID value and the RA with the B S SID.

8. The first AP of claim 7, wherein the transceiver is further configured to switch to the first operating channel before sending the measurement frame and when a second operating channel of the first AP is different from the first operating channel.

9. The first AP of claim 7, wherein the processor is further configured to obtain an identifier specified by the second AP before the transceiver sends the measurement frame.

10. A first access point (AP) comprising:
- a processor configured to instruct a second AP to masquerade as the first AP based on a basic service set identifier (BSSID) and an operating channel of the first AP in order to send a measurement frame to a station (STA) associated with the BSSID; and
- a transceiver configured to receive a measurement response frame from the STA,
- wherein the measurement response frame comprises a BSSID value equal to the BSSID, a receiver address (RA) equal to the BSSID, and a signal strength of the measurement frame as measured by the STA.

11. The first AP of claim 10, wherein the processor is further configured to guide the STA to be associated with the second AP after the transceiver receives the measurement response frame and when the signal strength meets a requirement.

12. The first AP of claim 10, wherein the processor is further configured to provide the second AP with an identifier specified for the second AP before the transceiver receives the measurement response frame.

13. The first AP of claim 12, wherein a value of a token field of the measurement response frame is the identifier.

14. The method of claim 2, wherein the switching to the first operating channel is a temporary channel change.

15. The method of claim 14, wherein the temporary channel change is performed without sending a Channel Switch Announcement (CSA) frame.

16. The method of claim 3, wherein a value of a token field of the measurement frame is the identifier.

17. The method of claim 6, wherein a value of a token field of the measurement response frame is the identifier.

18. The first AP of claim 8, wherein the switching to the first operating channel is a temporary channel change.

19. The first AP of claim 18, wherein the temporary channel change is performed without sending a Channel Switch Announcement (CSA) frame.

20. The first AP of claim 9, wherein a value of a token field of the measurement frame is the identifier.

* * * * *

UNITED STATES PATENT AND TRADEMARK OFFICE
CERTIFICATE OF CORRECTION

PATENT NO. : 11,856,434 B2
APPLICATION NO. : 17/126760
DATED : December 26, 2023
INVENTOR(S) : Zhijian He et al.

It is certified that error appears in the above-identified patent and that said Letters Patent is hereby corrected as shown below:

On the Title Page

Item (57) Abstract Line 1, should read: "A signal strength measurement method includes: obtaining, by a first access point (AP), a basic service set identifier (BSSID) of a second AP and a first operating channel, where the first operating channel is an operating channel of the second AP, and a station (STA) is associated with the BSSID of the second AP through the operating channel; and sending, by the first AP, a measurement frame to the STA through the operating channel, where a BSSID value of the measurement frame is the BSSID, the measurement frame indicates the STA to send a measurement response frame of which BSSID value is the BSSID, and the measurement response frame carries a signal strength of the measurement frame measured by the STA."

In the Claims

Claim 1, Column 16, Line 60: "to fill the BSSID value and the RA with the BS SID." should read "to fill the BSSID value and the RA with the BSSID."

Claim 4, Column 17, Line 4: "based on a basic service set identifier (B S SID) of the" should read "based on a basic service set identifier (BSSID) of the"

Claim 7, Column 17, Line 23: "identifier (B S SID) of a second AP and a first operating" should read "identifier (BSSID) of a second AP and a first operating"

Claim 7, Column 17, Line 37: "to fill the BSSID value and the RA with the B S SID." should read "to fill the BSSID value and the RA with the BSSID."

Signed and Sealed this
Twentieth Day of February, 2024

Katherine Kelly Vidal
*Director of the United States Patent and Trademark Office*